(12) United States Patent
Shehab et al.

(10) Patent No.: US 7,467,685 B2
(45) Date of Patent: Dec. 23, 2008

(54) ARRAY SEISMIC FLUID TRANSDUCER SOURCE

(75) Inventors: Gamal Shehab, New Orleans, LA (US); Robert D. Mann, New Orleans, LA (US); Brian Abbott, Belle Chasse, LA (US); James F. Minear, Belle Chasse, LA (US); David Gillis, New Orleans, LA (US); George R. Kear, New Orleans, LA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 285 days.

(21) Appl. No.: 10/853,569

(22) Filed: May 25, 2004

(65) Prior Publication Data
US 2005/0263340 A1 Dec. 1, 2005

(51) Int. Cl.
*G01V 1/04* (2006.01)
(52) U.S. Cl. .................. 181/121; 181/111; 181/113; 181/108; 181/114
(58) Field of Classification Search .............. 181/121, 181/114, 108, 113, 111, 106, 155
See application file for complete search history.

(56) References Cited

U.S. PATENT DOCUMENTS

| | | | |
|---|---|---|---|
| 2,062,151 A | 11/1936 | Weatherby | |
| 3,881,168 A | 4/1975 | Farr et al. | |
| 3,909,776 A | 9/1975 | Broding et al. | |
| 4,033,429 A | 7/1977 | Farr | |
| 4,207,619 A | 6/1980 | Klaveness | |
| 4,363,112 A | 12/1982 | Widrow | |
| 4,365,322 A | 12/1982 | Widrow | |
| 4,569,412 A | 2/1986 | Bouyoucos et al. | |
| 4,671,379 A | 6/1987 | Kennedy et al. | |
| 4,674,591 A * | 6/1987 | Vogen | 181/108 |
| 4,858,718 A | 8/1989 | Chelminski | |
| 4,862,990 A | 9/1989 | Cole | |
| 4,923,030 A * | 5/1990 | Meynier | 181/106 |

(Continued)

FOREIGN PATENT DOCUMENTS

EP 0 397 318 B1 1/1994

OTHER PUBLICATIONS

"Sandia reports improved downhole seismic receiver," Oil & Gas Journal, Jul. 15, 1991, p. 88 (2 pages).

(Continued)

*Primary Examiner*—Walter Benson
*Assistant Examiner*—Forrest M Phillips
(74) *Attorney, Agent, or Firm*—Darla P. Fonseca; Jaime Castano

(57) ABSTRACT

An apparatus for generating a seismic signal in a wellbore includes an elongated housing configured to be disposed in the wellbore; a piston slidably disposed in an internal bore in the elongated housing; a strike plate fixed on the elongated housing proximate one end of the internal bore; and an energizing mechanism configured to move the piston to hit the strike plate. A downhole system for seismic survey of a formation penetrated by a wellbore includes at least one seismic receiver; a seismic source; and at least one inflatable packer configured to separate the seismic source and the at least one seismic receiver in different compartments in the wellbore when inflated.

19 Claims, 5 Drawing Sheets

U.S. PATENT DOCUMENTS

| | | | |
|---|---|---|---|
| 4,991,685 | A | 2/1991 | Airhart |
| 5,137,109 | A | 8/1992 | Dorel |
| 5,170,018 | A | 12/1992 | Potier |
| 5,171,943 | A | 12/1992 | Balogh et al. |
| 5,477,101 | A | 12/1995 | Ounadjela |
| 6,009,972 | A * | 1/2000 | Choi et al. .................. 181/155 |
| 6,193,010 | B1 | 2/2001 | Minto |
| 6,630,890 | B1 | 10/2003 | Endo et al. |
| 6,634,427 | B1 | 10/2003 | Turner et al. |
| 2005/0056421 | A1 * | 3/2005 | Homan et al. ............ 166/254.2 |
| 2005/0252711 | A1 * | 11/2005 | Rau ........................... 181/121 |

OTHER PUBLICATIONS

"Power-pulse, seismic-while-drilling technologies tested," Oil & Gas Journal, Nov. 13, 2000, p. 49 (2 pages).

"The Borehole Tubewave Damper Probe," W. T. Balogh, Expanded Abstracts, SEG, 159-162, 1992 (4 pages).

* cited by examiner

ARRAY SEISMIC FLUID TRANSDUCER SOURCE

BACKGROUND OF INVENTION

1. Field of the Invention

The invention relates generally to seismic surveys. More particularly, this invention relates to transducer sources for seismic surveys 2. Background Art Seismic surveys are commonly used to profile rock formation properties. Conventional seismic surveys use surface energy sources and surface receivers to detect reflections from subsurface acoustic impedance contrasts, i.e., subsurface rock strata. However, results from the conventional seismic surveys are not always satisfactory because the sound waves have to travel long distances back and forth. Cross-well seismic surveys, in which the seismic source and the receivers are deployed separately in nearby wells, overcome some of the disadvantages of the conventional seismic surveys. However, a cross-well approach requires the drilling of additional wells, with added costs.

Vertical Seismic Profiling (VSP) provides more accurate information than conventional seismic surveys. In VSP, seismic sources are located at the surface and the sensors (e.g., geophones, hydrophones, accelerometers) are located in the borehole. VSP, however, suffers from several drawbacks, including costs associated with multiple surface energy sources and multiple ghost images due to energy trapped in the surface layer. More recently, reverse (or inverse) VSP (RVSP) was developed to overcome the logistic limitations of the multiple surface energy sources needed in some VSP surveys. In RVSP, a single seismic source is deployed in the borehole and the receivers are arranged on the surface. In "long-spacing sonic" profiling, the receivers and the source are placed in the same borehole, with a substantial distance separating the source and the receivers. Both the RVSP and the long-spacing sonic technique use seismic sources that are placed in boreholes, i.e., downhole seismic sources.

Various downhole seismic sources have been developed over the years. Some downhole sources use drill bits or drill strings as the sources. For example, U.S. Pat. No. 2,062,151 issued to Weatherby discloses a source using a drill bit as an impulse generator of seismic waves, while U.S. Pat. Nos. 4,363,112 and 4,365,322 issued to Widrow disclose sources using the natural random vibrations of drill strings to launch seismic waves.

Various other types of downhole seismic sources, not using a drill bit or drill string, are also available. For example, U.S. Pat. No. 3,909,776 issued to Broding et al. discloses a source using a fluid driven oscillator, which changes the emitted frequencies as a function of time. Similarly, U.S. Pat. No. 3,881,168 issued to Farr et al. discloses a source using a mono-frequency fluid oscillator. U.S. Pat. No. 4,207,619 issued to Klaveness and U.S. Pat. No. 4,033,429 issued to Farr disclose sources using pulse generators located in the drill string. U.S. Pat. No. 5,137,109 issued to Dorel discloses a downhole seismic source in which a body containing a resonant system is clamped to the borehole wall. In the system of Dorel, the seismic signal is applied to the borehole by clamping the source to the borehole wall.

Other downhole seismic sources include impulsive sources (e.g., Primacord™, which is a detonation cord used in blasting and is available from Ensign-Bickford Co., Spanish Fork, Utah, and air guns), swept frequency signal generators (see e.g., U.S. Pat. No. 4,671,379 issued to Kennedy et al.), and piezoelectric actuators (see e.g., U.S. Pat. No. 5,477,101 issued to Ounadjela).

While these prior art seismic sources and various survey methods (e.g., cross-well, VSP, or RVSP surveys) can provide valuable information about the formations, there exists a need for seismic sources that can be used with seismic receivers in the same wellbore. The ability to have the source and receivers in the same borehole will make it possible to perform lateral profiling and to probe the reflecting interface from above and below the interface.

One problem associated with using the source and the receivers in the same borehole relates to the transmission of the seismic signals directly from the source to the receivers via the fluid column in the borehole. The fluid column in the borehole may function as a wave guide to transmit the signals with high efficiency. These seismic signals propagating in the borehole can interfere with the detection of the desired signals. To alleviate this problem, several prior art methods have been proposed.

U.S. Pat. No. 4,858,718 issued to Chelminski discloses a method for attenuating tube waves for use with an impulsive downhole seismic source. The device uses gas-filled resilient bladders positioned above and below the seismic source to attenuate. The bladders are protected in a perforated protective housing that has a diameter slightly smaller than the diameter of the borehole. Thus, these bladders do not completely separate the fluid column into isolated sections.

U.S. Pat. No. 5,171,943 issued to Balogh et al. discloses a tube wave damper probe for the suppression of borehole tube waves in seismic applications. See also, W. T. Balogh, "*The Borehole Tubewave Damper Probe*," Expanded Abstracts, SEG, 159-162, 1992. The damper comprises a gas-filled bladder disposed in the housing. The gas-filled bladder functions as a modified Helmholtz resonator to reduce the propagation of waves of certain frequencies.

U.S. Pat. No. 5,170,018 issued to Potier discloses the use of absorptive material, such as cork or Sorbothane™ from Sorbothane, Inc. (Kent, Ohio), deployed in a non-metallic housing above and below a seismic receiver in cross-well or RVSP surveys.

Most of these prior art methods of isolating seismic wave propagation in borehole fluids are for use in cross-well, VSP or RVSP applications, in which the source and the receivers are not in the same borehole. If the receivers and the source are in the same borehole, the tube waves will be substantially stronger.

Being able to perform seismic profiling with the source and receivers in the same borehole offers many advantages. Therefore, it is desirable to have seismic sources that can be used with the receivers in the same borehole and to have efficient methods for minimizing the propagation of seismic waves in the borehole fluids.

SUMMARY OF INVENTION

One aspect of the invention relates to apparatus for generating a seismic signal in a wellbore. An apparatus in accordance with one embodiment of the invention includes an elongated housing configured to be disposed in the wellbore; a piston slidably disposed in an internal bore in the elongated housing; a strike plate fixed on the elongated housing proximate one end of the internal bore; and an energizing mechanism configured to move the piston to hit the strike plate.

One aspect of the invention relates to downhole systems for seismic survey of a formation penetrated by a wellbore. A system in accordance with one embodiment of the invention includes at least one seismic receiver; a seismic source; and at least one inflatable packer configured to separate the seismic source and the at least one seismic receiver in different compartments in the wellbore when inflated.

One aspect of the invention relates to methods for seismic survey of a formation penetrated by a wellbore. A method in accordance with one embodiment of the invention includes disposing a downhole seismic tool in the wellbore, wherein the downhole tool comprises a seismic source, at least one seismic receiver, and at least one inflatable packer, wherein the at least one inflatable packer is disposed between the seismic source and the at least one seismic receiver; inflating the at least one inflatable packer to separate the seismic source and the at least one seismic receiver in different compartments in the wellbore; generating a seismic signal using the seismic source; and detecting the seismic signal, after it has traversed the formation, using the at least one seismic receiver.

Other aspects and advantages of the invention will be apparent from the following description and the appended claims.

DETAILED DESCRIPTION

Embodiments of the invention relate to apparatus (e.g., seismic sources) and methods that may be used to perform seismic surveys with the source and receivers in the same borehole. A seismic source in accordance with the invention may be used in a fluid-filled borehole, either in the same borehole as the receivers or in a different borehole. Devices and methods are provided that can effectively suppress direct transmission of the seismic signals from the source to the receivers when they are used in the same borehole. Some embodiments of the invention may be used in a through-wire configuration, i.e., they are configured to relay power and data transmission to other devices in a "string" of downhole devices.

Figure 1:
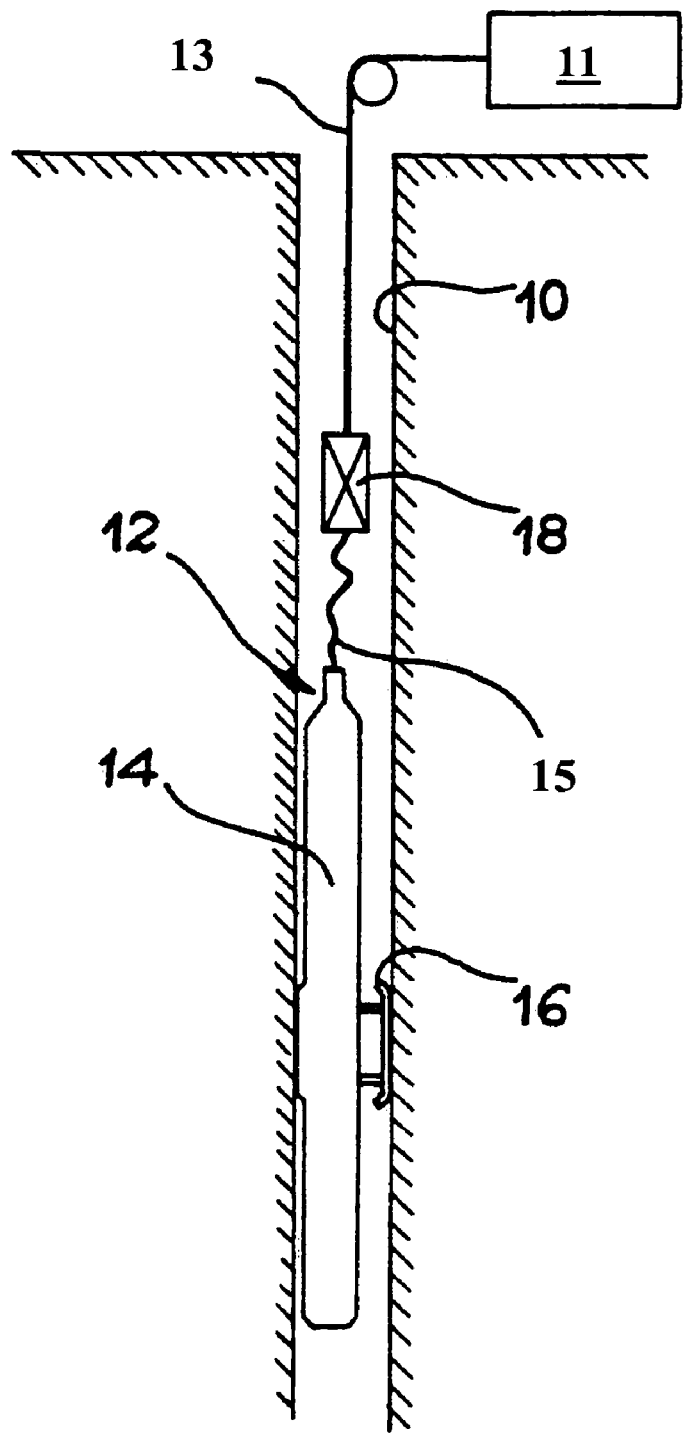
FIG. 1 shows a prior art seismic source.

FIG. 1 shows an example of a conventional seismic logging system. In FIG. 1, a seismic source 12 is disposed in a borehole 10, which passes through underground formations to be analyzed. Depending on the measurement technique used, receivers (not shown) may be placed in adjacent boreholes (cross-well technique) or on the surface of the ground (RVSP technique). In operation, the seismic source 12 may be actuated successively at different depths and the signals detected by the receivers are analyzed in order to determine the characteristics of the various reflecting interfaces in the formations surrounding the borehole 10.

The seismic source 12 comprises a main module 14 that contains the source and is designed to be clamped in the borehole 10 by clamping means 16. Above the main module 14, the seismic source 12 also comprises an electronic control module 18, which is connected to the main module 14 by a cable 15 which is slack when the clamping means 16 is in action. The slack in the cable 15 provides mechanical decoupling between the main module 14 and the electronic control module 18, thereby reducing the mass and the length of the active portion of the source.

The electronic control module 18 controls the seismic source 12 according to information transmitted from an electronic unit 11 situated on the surface. Signal transmission from the electronic unit 11 to the electronic control module 18 takes place via a cable 13. Alternatively, the signals that control the seismic source 12 may originate from a processor unit (not shown) disposed in the control module 18 or another downhole unit.

As noted above, several types of seismic sources have been developed in the prior art. These include impulsive sources, sweep frequency sources, and piezoelectric sources. In accordance with one embodiment of the invention, a seismic source is based on the impulsive mechanism. For example, an acoustic signal may be generated by a piston striking a plate. The shock waves generated from such impact are then transmitted into the borehole and the formation.

Figure 2:
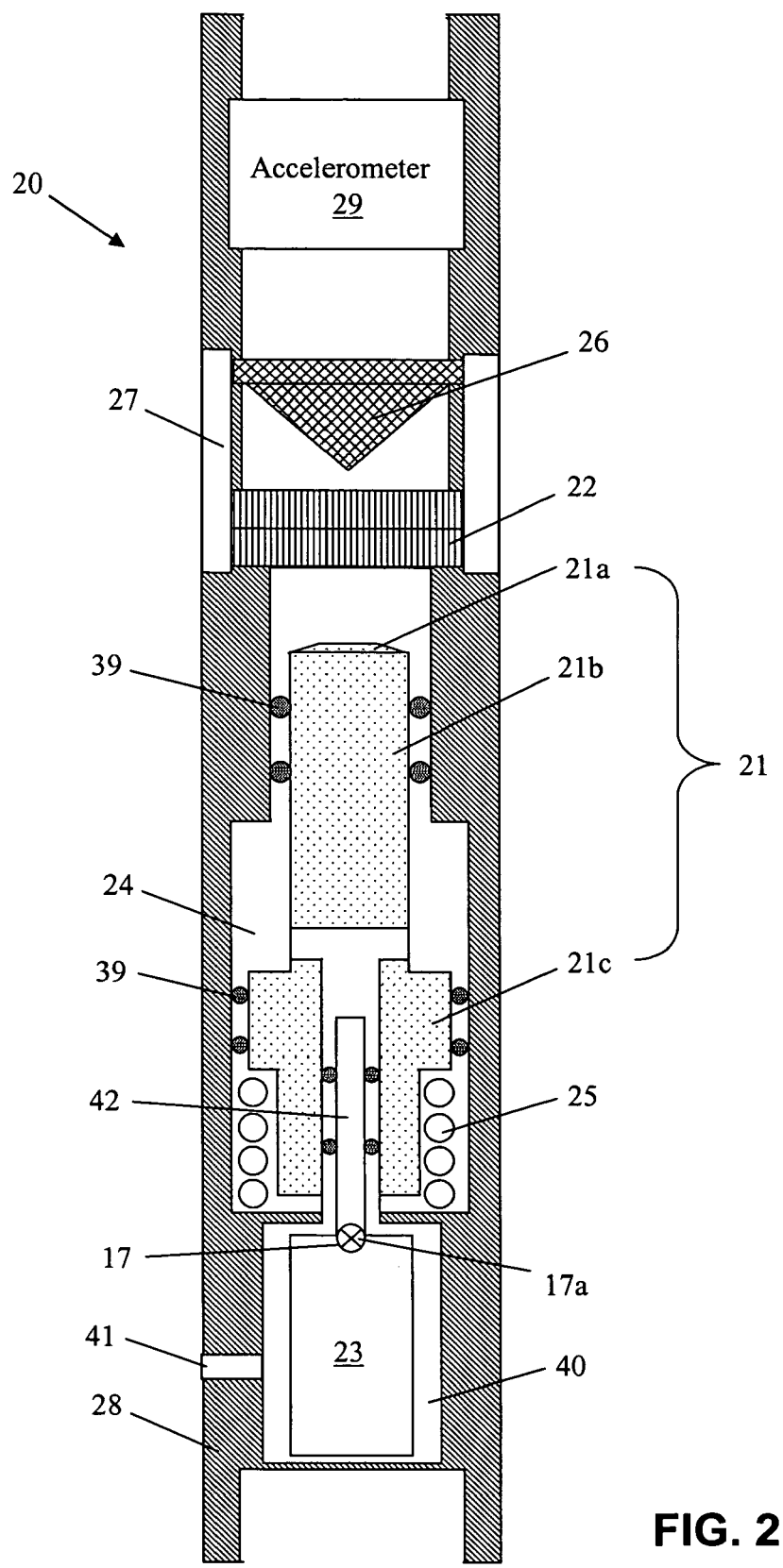
FIG. 2 shows a seismic source in accordance with one embodiment of the invention.

FIG. 2 shows a schematic of such a seismic source 20. The main components of the system comprise a piston 21 and a plate 22 disposed in a housing 28. The piston 21 is slidably disposed in a cylindrical chamber 24 in the housing 28 such that it can strike the plate 22 when it slides in one direction (the up direction as shown in this configuration). A deflecting structure 26 with a significant mass is mounted behind the plate 22, i.e., opposite the piston 21. The deflecting structure 26 may have a cone shape (or other suitable shapes) with the apex in the proximity of the plate 22. The shock waves generated by piston 21 striking the plate 22 are deflected by the cone-shaped surface of the mass 26 to travel laterally. Openings 27 are provided in this section of the housing 28 so that the shock waves can propagate into the borehole and eventually into the formation (not shown).

The piston 21 may be in various shapes and preferably has a significant mass. For example, the piston 21 may be in a cylindrical shape that can slide in a cylindrical bore in the housing 28. In the particular embodiment shown in FIG. 2, the piston 21 comprises several sections of different diameters: a mandrel end 21c, a central body (which provides mass) 21b, and the striking end 21a. The mandrel end 21c is for coupling with an energizing mechanism that pushes the piston 21 towards the plate 22. The central body 21b may have a larger diameter to provide more mass. The striking end 21a of the piston may have a smaller diameter than the central body 21b. This particular configuration represents one example of the piston. One of ordinary skill in the art would appreciate that the piston 21 may also be in other shapes. As shown in FIG. 2, the piston 21 is contained inside a bored cylindrical chamber 24 that also includes sections of different internal diameters to accommodate the various sections of the piston 21.

The piston 21 may be energized by a spring mechanism or other mechanisms. FIG. 2 illustrates a spring-operated mechanism. As shown, a coil-spring 25 is mounted around the mandrel-end 21c of the piston 21 to serve as a energy storage mechanism. The spring 25 may be energized (compressed) by any suitable mechanism, such as electric power (e.g., motor driven compression) or hydraulic power.

FIG. 2 illustrates a hydraulic power energizing mechanism, which includes a hydraulic pump and a valve system. The hydraulic pump 23 pumps a hydraulic fluid from reservoir 40 into chamber 24. The valve system 17 may include a one-way valve that allows the hydraulic fluid to be pumped from the reservoir 40 into chamber 24, but would not allow the hydraulic fluid in chamber 24 to flow back to the pump 23 or the reservoir 40. The hydraulic fluid is retained in chamber 24, between piston 21 and housing 28, by circumferential O-ring seals 39. The higher pressure in chamber 24 drives the piston 21 against the spring 25, compressing it. Other mechanisms similar to a spring may be used, including a bladder having a compressible fluid inside.

A relief valve (which may be an electronically-controlled solenoid valve, for example) is provided to allow for rapid transfer of the high-pressure hydraulic fluid from the chamber 24 back to the hydraulic fluid reservoir 40. The relief valve 17a may be included as part of the valve system 17 or as a separate component (not shown). The hydraulic fluid may enter and exit the chamber 24 via a tube 42, for example, along the axis of the piston 21.

Once the relief valve 17a is open, the pressure in chamber 24 decreases rapidly, allowing the stored energy in the compressed spring 25 to push the piston 21 towards the plate 22. The striking end of the piston 21 is contained within the smaller diameter section of chamber 24, which acts as a travel guide as the piston is driven onto the striking plate 22.

While the embodiment shown in FIG. 2 uses a spring mechanism to "push" the piston towards the strike plate, one of ordinary skill in the art would appreciate that a modified mechanism may be designed that the piston is "pulled" by the spring mechanism. Similarly, the spring mechanism may be replaced with other mechanisms, such as elastic bladders.

The strike plate 22 serves to transfer the impact energy delivered from the piston 21 to the surrounding fluid environment. The strike plate 22 may be mounted to the housing 28 or the deflecting structure 26. In preferred embodiments, the strike plate 22 is attached to the deflecting structure 26. In some embodiments, the strike plate 22 may be an integral part of the housing 28 or the deflecting structure 26. In this description, the term "strike plate" is intended to include both a separate plate and a plate that is an integral part of the housing 28 or the deflecting structure 26. The striking surface of the strike plate 22 and the surface of the piston 21 may be grooved to allow for fluid escape when the piston 21 strikes the plate 22. A space between the strike plate 22 and the deflecting structure 26 may be filled with a fluid that is in fluid communication with the borehole fluid. Thus, seismic waves generated in the fluid between the plate 22 and the deflecting structure 26 can propagate into the borehole and the formation.

The hydraulic fluid that is used to compress spring 25 is stored in a hydraulic fluid reservoir 40, which may be included in the housing 28 proximate the hydraulic pump 23 (or at another location). The hydraulic reservoir 40 may be pressure-compensated with respect to the external borehole pressure through a pressure compensation mechanism 41. One of ordinary skill in the art would appreciate that any pressure compensation mechanism may be used for this purpose, such as a piston device, a spring system, and a bladder system.

Figure 3:
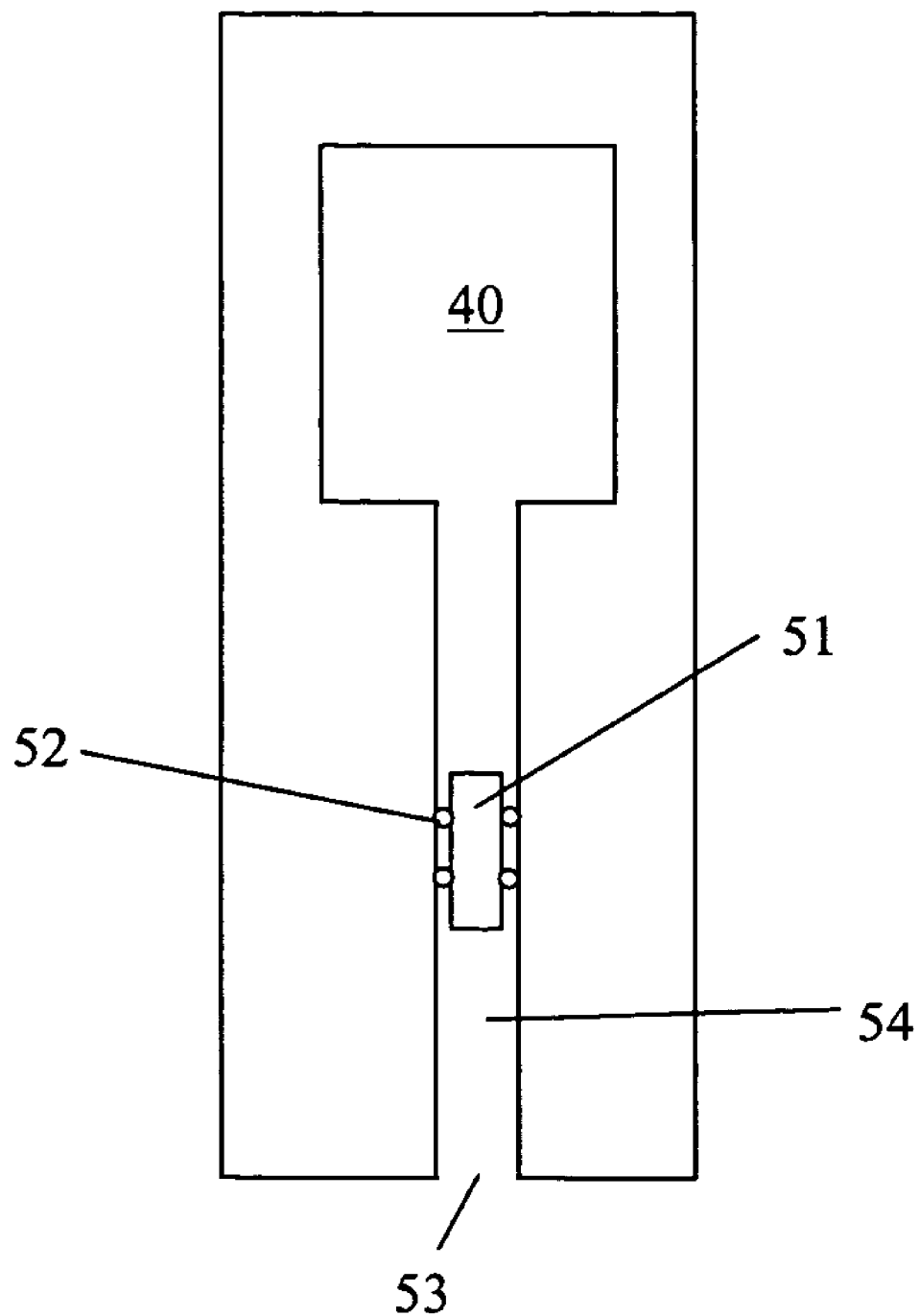
FIG. 3 shows a pressure compensating mechanism that can be used with embodiments of the invention.

FIG. 3 illustrates one embodiment of a pressure compensation mechanism involving a piston. As shown, a piston 51 is slidably disposed in a cylinder 54 that links the enclosed reservoir 40 and the outside of the housing via opening 53. The seals 52 are used to isolate the fluid in the reservoir 40 from the fluid outside the housing. When the pressure outside is higher than the pressure in the reservoir 40, the piston 51 is pushed towards the reservoir 40, reducing the effective volume of the reservoir 40. As a result, the fluid pressure inside the reservoir 40 increases until the pressure inside is substantially the same as that of the outside. Similarly, when the outside pressure is lower than the inside pressure, the piston 51 is pushed away from the reservoir 40, increasing the effective volume of the reservoir 40. As a result the pressure inside decreases until there is no substantial difference in the pressures on both ends of the piston 51. This is only an example of a pressure compensating mechanism. One of ordinary skill in the art would appreciate other mechanisms can be adapted to achieve the same purpose.

Referring again to FIG. 2, the outer housing 28 of the device for the most part may be a solid outer cylinder. However, the housing 28 in the vicinity of the plate 22 includes openings 27 to allow the shock waves to propagate into the borehole and the formation. Similarly, in the vicinity of the borehole pressure compensating system, there might be an opening (e.g., 53 in FIG. 3) for pressure compensation.

In one embodiment, the outer housing 28 around the plate 22 comprises a "slotted sleeve" (i.e., the openings 27 comprise slots in the housing 28). The "slotted sleeve" allows for fluid communication between the fluids in the borehole and in the region between the strike plate 22 and deflecting structure 26. "Fluid communication" as used herein includes any manner which permits the seismic waves to travel from inside the tool to the fluid outside the tool, including direct exchange (flow) of fluids from the inside compartment to the outside. Alternatively, the seismic waves may be propagated from inside the tool to the outside by transmission of the energy through a thin layer of a material (e.g., a sheet of metal, rubber, or plastic) covering the slotted sleeve, without direct exchanges of the fluid. If a "protective cover" is used, the fluid inside should be pressure compensated such that the inside pressure is substantially the same as the outside pressure.

As noted above, a seismic source of the invention may be used in a through-wire configuration. Thus, the housing 28 may include electrical and mechanical connections to join with other sections of the tool. For example, the housing 28 may include threaded pipe connectors (e.g., pin and box ends) on both ends to allow the housing 28 to connect with other sections of the tool. In addition, the housing 28 may include internal passages (not shown) and pin-and-socket electrical connections (not shown) for connecting power and other electrical components above and below this section.

In addition, the seismic source 20 may include other devices to provide auxiliary information. For example, an accelerometer 29 may be included to provide a signal to the surface instrument for timing and for confirmation that the source is activated.

As noted above, a seismic source of the invention may be used in the same borehole as the seismic receivers (e.g., geophones). When used in this configuration, direct couplings between the source and the receivers should be minimized, in particular direct couplings via the fluid column in the borehole. Some embodiments of the invention relate to devices and methods for minimizing direct couplings between a seismic source and seismic receivers in the same borehole.

In accordance with one embodiment of the invention, a seismic array may include a seismic source and one or more seismic receivers for deployment in the same borehole. One or more inflatable packers, located below and above the seismic source, may be included in the array to isolate the fluid column into different sections. Any inflatable packers known in the art may be used for this purpose. The packers may be inflated by pumping fluids (liquid or gas) into the packers, which are made of a flexible material such as rubber or an elastomer. The packers are deployed in a deflated state and are inflated when they reach the desired location. The control signals for the inflation may be transmitted from the surface or from a processor downhole.

Figure 4:
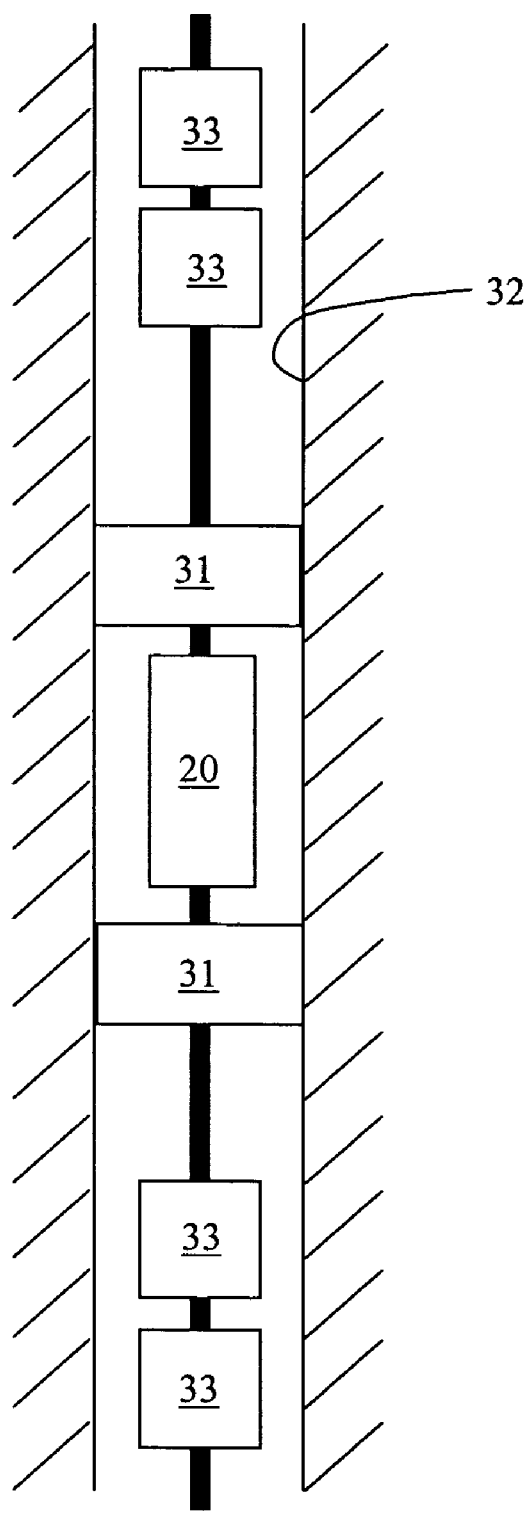
FIG. 4 shows a downhole seismic survey tool in accordance with one embodiment of the invention.

FIG. 4 illustrates an array in accordance with one embodiment of the invention for deployment in a borehole. As shown in FIG. 4, a seismic array 30 includes four seismic receivers 33 and a seismic source 20 in a borehole 32. Two inflatable packers 31 are deployed to seal against the wall of the borehole 32 at locations above and below the seismic source 20 such that the receivers 33 and the seismic source 20 are isolated in different compartments in the borehole 32. Because the seismic source 20 is isolated in a different compartment, the seismic signals generated by the source 20 are not directly communicated through the well-bore to the receivers.

Note that the inflatable packers are forced against the wall of the borehole with positive pressures. This ensure that the fluids in difference compartments cannot directly communicate with each other. In addition, packers are effective dampers of the seismic wave. Indirect propagation of the seismic signals through the packers will be minimal.

While FIG. 4 illustrates the use of a single inflatable packer at each location (above and below the seismic source 20), more than one packer may also be used at each location to enhance the acoustic isolation. In addition, mechanisms may be included in the housing 28 to minimize the transmission of seismic signals through the housing or the cable that deploys the seismic source. For example, air chambers or other fluid filled sacks may be included in the housing 28 above and below the source 20 to dampen the seismic signal transmission. Alternatively, housing 28 or the wire or string used to deploy the seismic source 20 may include a section made of a material that can damp seismic wave transmission.

Note that the downhole seismic tool shown in FIG. 4 includes seismic receivers above and below the seismic source. As a result, two inflatable packers are needed to isolate the seismic source from the seismic receivers. In some embodiments of the invention, a downhole seismic tool may include seismic receivers on one side of the seismic source. In this case, only one packer may be used to isolate the seismic source from the seismic receivers.

Figure 5:
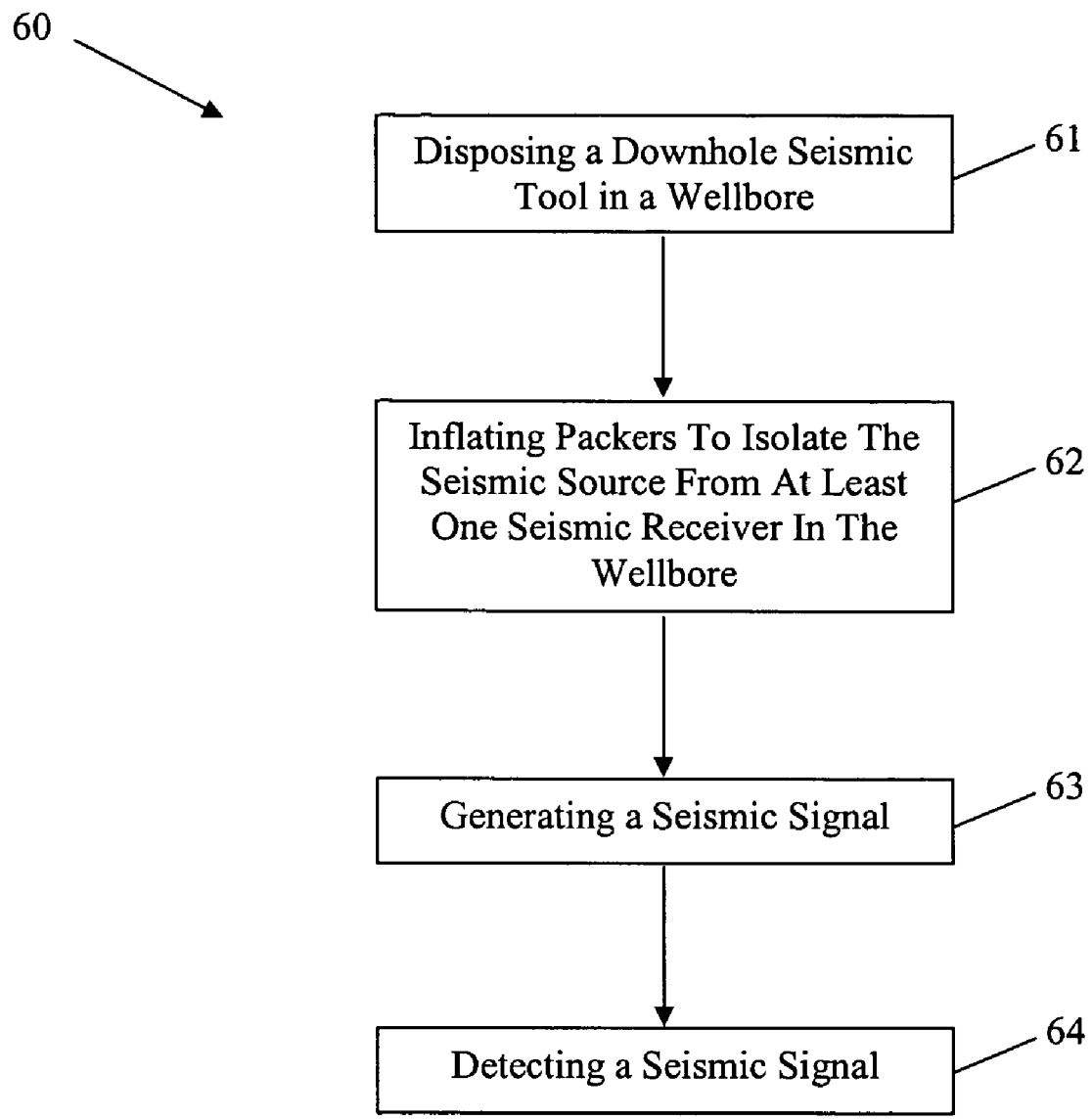
FIG. 5 shows a method for seismic survey in accordance with one embodiment of the invention.

Some embodiments of the invention relate to methods of seismic surveys using a seismic source of the invention. FIG. 5 illustrates one such method. As shown, a method 60 for seismic survey may include the step of disposing a downhole seismic tool in a wellbore (step 61). The downhole seismic tool may be lowered into the wellbore on a wireline, for example. Once the tool is at the desired depth, the inflatable packers on the tool are inflated to isolate the seismic source from the seismic receivers in the wellbore (step 62). Once the seismic source is isolated from the seismic receiver, the source may be energized to generate a seismic signal (step 63). As noted above, the inflatable packers prevent the seismic signal from traveling in the wellbore. The signal that returns from the formation may reach the receivers in the different compartments of the wellbore. This returned signal is detected by the receivers (step 64). These processes may be repeated at different depths in the wellbore to obtain the formation profile around the wellbore.

Advantage of embodiments of the invention may include one or more of the following. A seismic source of the invention may be deployed in the same borehole as the seismic receivers. That is, a seismic source in accordance with embodiments of the invention is not limited to cross-well application, vertical seismic profiling, or reverse vertical seismic profiling. Being able to provide seismic signals in the same wellbore as the receivers makes it possible to perform lateral seismic profiling and to probe an reflective interface from above and below the interface. Accordingly, embodiments of the invention can more accurately image the locations and angles of any fault, fracture, or dipping plane near the wellbore.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for generating a seismic signal in a wellbore, comprising:
    an elongated housing configured to be disposed in the wellbore;
    a piston slidably disposed in an internal bore in the elongated housing;
    a strike plate disposed on the elongated housing proximate one end of the internal bore, wherein the strike plate has a substantially flat surface opposite the side to be hit by the piston such that a majority of fluid waves generated will propagate in a direction parallel with the longitudinal axis of the elongated housing;
    a deflecting mass having a cone-shaped surface disposed in the elongated housing and configured to deflect the fluid waves by the cone-shaped surface into directions that are substantially perpendicular to the longitudinal axis of the elongated housing;
    a slotted sleeve disposed around the strike plate to allow for fluid communication between fluids outside the elongated housing and fluids in a region between the strike plate and the deflecting mass inside the elongated housing; and
    an energizing mechanism configured to move the piston to hit the strike plate.

2. The apparatus of claim 1, wherein the energizing mechanism comprises a spring configured to engage one end of the piston.

3. The apparatus of claim 1, wherein the energizing mechanism is configured to be energized by a hydraulic system.

4. The apparatus of claim 3, wherein the hydraulic system comprises a hydraulic pump, a valve system, and a hydraulic fluid reservoir.

5. The apparatus of claim 4, wherein the hydraulic fluid reservoir is coupled to a pressure compensating mechanism for maintaining a pressure inside the hydraulic fluid reservoir to be substantially identical to a pressure outside the elongated housing.

6. The apparatus of claim 1, wherein the elongated housing comprises at least one opening proximate the strike plate, wherein the at least one opening is to permit the seismic signal to propagate to the wellbore.

7. The apparatus of claim 1, wherein the strike plate is attached to the deflecting mass.

8. The apparatus of claim 7, wherein the strike plate and the deflecting mass form an integral part.

9. The apparatus of claim 1, further comprising an accelerometer.

10. The apparatus of claim 1, further comprising at least one inflatable packer attached to the elongated housing, wherein the at least one inflatable packer is configured to engage a wall of the wellbore, when inflated, to isolate a section of the elongated housing that contains the piston and the strike plate in a compartment in the wellbore.

11. A downhole system for seismic survey of a formation penetrated by a wellbore, comprising: at least one seismic receiver; a seismic source; and at least one inflatable packer configured to separate the seismic source and the at least one seismic receiver in different compartments in the wellbore when inflated, wherein the seismic source comprises:

an elongated housing configured to be disposed in the wellbore;

a piston slidably disposed in an internal bore in the elongated housing;

a strike plate disposed on the elongated housing proximate one end of the internal bore, wherein the strike plate has a substantially flat surface opposite the side to be hit by the piston such that a majority of fluid waves generated will propagate in a direction parallel with the longitudinal axis of the elongated housing;

a deflecting mass having a cone-shaped surface disposed in the elongated housing and configured to deflect the fluid waves by the cone-shaped surface into directions that are substantially perpendicular to the longitudinal axis of the elongated housing, a slotted sleeve disposed around the strike plate to allow for fluid communication between fluids outside the elongated housing and fluids in a region between the strike plate and the deflecting mass inside the elongated housing; and an energizing mechanism configured to move the piston to hit the strike plate.

12. The system of claim 11, further comprising an accelerometer.

13. The system of claim 11, wherein the energizing mechanism is configured to be energized by a hydraulic system.

14. The system of claim 13, wherein the hydraulic system comprises a hydraulic pump, a valve system, and a hydraulic fluid reservoir.

15. The system of claim 14, wherein the hydraulic fluid reservoir is coupled to a pressure compensating mechanism for maintaining a pressure inside the hydraulic fluid reservoir to be substantially identical to a pressure outside the elongated housing.

16. The apparatus of claim 11, further comprising a deflecting mass disposed in the elongated housing to deflect the seismic signal into the wellbore.

17. The system of claim 16, wherein the strike plate is attached to the deflecting mass.

18. The apparatus of claim 17, wherein the strike plate and the deflecting mass form an integral part.

19. A method for seismic survey of a formation penetrated by a wellbore, comprising: disposing a downhole seismic tool in the wellbore, wherein the downhole tool comprises a seismic source, at least one seismic receiver, and at least one inflatable packer, wherein the at least one inflatable packer is disposed between the seismic source and the at least one seismic receiver; inflating the at least one inflatable packer to separate the seismic source and the at least one seismic receiver in different compartments in the wellbore; generating a seismic signal using the seismic source; and detecting the seismic signal, after it has traversed the formation, using the at least one seismic receiver, wherein the seismic source comprises:

an elongated housing configured to be disposed in the wellbore;

a piston slidably disposed in an internal bore in the elongated housing;

a strike plate disposed on the elongated housing proximate one end of the internal bore, wherein the strike plate has a substantially flat surface opposite the side to be hit by the piston such that a majority of fluid waves generated will propagate in a direction parallel with the longitudinal axis of the elongated housing;

a deflecting mass having a cone-shaped surface disposed in the elongated housing and configured to deflect the fluid waves by the cone-shaped surface into directions that are substantially perpendicular to the longitudinal axis of the elongated housing, a slotted sleeve disposed around the strike plate to allow for fluid communication between fluids outside the elongated housing and fluids in a region between the strike plate and the deflecting mass inside the elongated housing; and an energizing mechanism configured to move the piston to hit the strike plate.

\* \* \* \* \*